(12) United States Patent
Brites et al.

(10) Patent No.: US 9,785,538 B2
(45) Date of Patent: Oct. 10, 2017

(54) ARBITRARY INSTRUCTION EXECUTION FROM CONTEXT MEMORY

(71) Applicant: Freescale Semiconductor, Inc., Austin, TX (US)

(72) Inventors: Celso Fernando Veras Brites, Campinas (BR); Alex Rocha Prado, Campinas (BR)

(73) Assignee: NXP USA, Inc., Austin, TX (US)

(*) Notice: Subject to any disclaimer, the term of this patent is extended or adjusted under 35 U.S.C. 154(b) by 224 days.

(21) Appl. No.: 14/842,784

(22) Filed: Sep. 1, 2015

(65) Prior Publication Data

US 2017/0060582 A1 Mar. 2, 2017

(51) Int. Cl.
*G06F 9/30* (2006.01)
*G06F 11/36* (2006.01)

(52) U.S. Cl.
CPC ................................. *G06F 11/3648* (2013.01)

(58) Field of Classification Search
None
See application file for complete search history.

(56) References Cited

U.S. PATENT DOCUMENTS

| | | | |
|---|---|---|---|
| 5,551,045 A | 8/1996 | Kawamoto et al. | |
| 6,112,298 A | 8/2000 | Deao et al. | |
| 6,643,803 B1 | 11/2003 | Swoboda et al. | |
| 2003/0163675 A1* | 8/2003 | Bennett | G06F 9/3824 712/228 |
| 2004/0205720 A1* | 10/2004 | Hundt | G06F 11/3644 717/124 |
| 2005/0166096 A1* | 7/2005 | Yount | G06F 11/263 714/38.14 |
| 2008/0126865 A1* | 5/2008 | Lee | G06F 11/3652 714/34 |
| 2013/0339681 A1 | 12/2013 | Prado et al. | |

FOREIGN PATENT DOCUMENTS

JP 2004220070 A * 8/2004 ........... G06F 9/3009

* cited by examiner

*Primary Examiner* — William B Partridge

(57) ABSTRACT

Arbitrary instruction execution from context memory. In some embodiments, an integrated circuit includes a processor core; a context management circuit coupled to the processor core; and a debug support circuit coupled to the context management circuit, where: the context management circuit is configured to halt a thread running on the processor core and save a halted thread context for that thread into a context memory distinct from the processor core, where the halted thread context comprises a fetched instruction as the next instruction in the execution pipeline; the debug support circuit is configured instruct the context management circuit to modify the halted thread context in the context memory by replacing the fetched instruction with an arbitrary instruction; and the context management circuit is further configured to cause the thread to resume using the modified thread context to execute the arbitrary instruction.

20 Claims, 4 Drawing Sheets

ARBITRARY INSTRUCTION EXECUTION FROM CONTEXT MEMORY

FIELD

This disclosure relates generally to processors, and more specifically, to systems and methods for executing arbitrary instructions from a context memory.

BACKGROUND

Processors are electronic circuits capable of executing one or more sequences of instructions, tasks, or threads. In a conventional processor, operations are executed in series. As such, if an operation takes a long time to complete (e.g., if its completion depends upon the result of an external event), a subsequent operation still has to wait in a queue. The wait occurs even when execution of the subsequent operation is independent from that of the preceding operation, and regardless of whether the processor is otherwise available during that time.

The concept of multithreading or multitasking was developed, at least in part, to improve the use of available computing resources. Generally speaking, a multithreading or multitasking processor includes hardware support for switching between different instructions, tasks, or threads more efficiently than conventional processors.

As a processor operates, errors may occur. And, in the event of an error, techniques exist to capture state information of the processor at the time of that error. Such information may include, for instance, register values, pointers, program counters, condition codes, and the like. A debugging tool may then be used to analyze that captured information.

As the inventors have recognized, complex debug operations often need to evaluate resources that are only accessible by executing specific or arbitrary instructions as part of the debugging process. Accordingly, the inventors have developed systems and methods that enable a debugger to execute an arbitrary instruction in a multithread processor without interfering with the execution of other threads.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
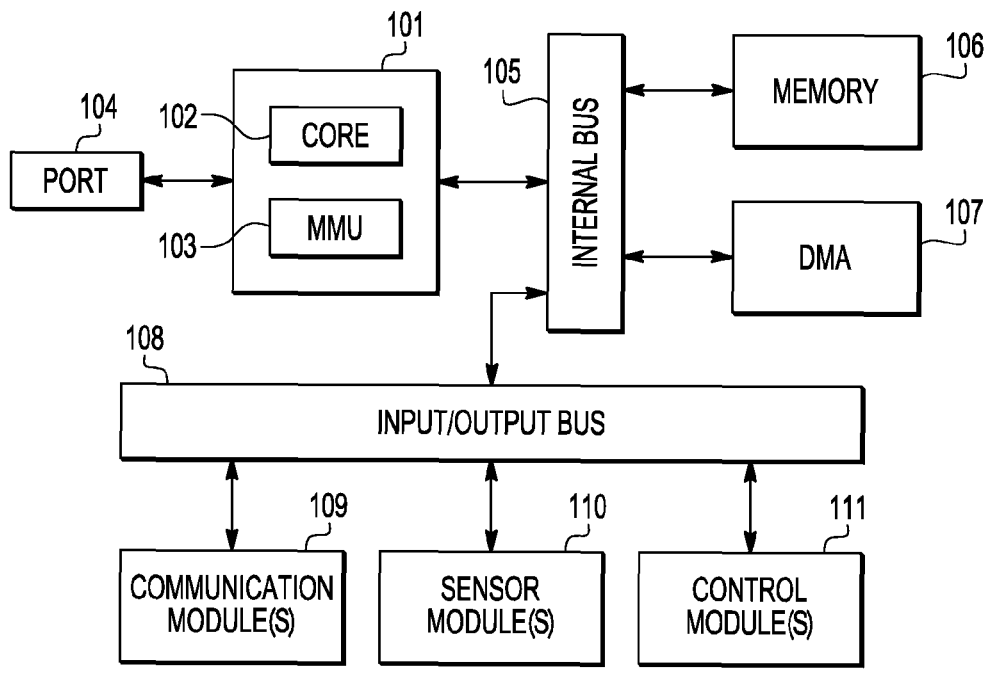
FIG. 1 is a block diagram of a processor according to some embodiments.

In multithreaded processors, if is often desirable to execute certain debug operations to evaluate resources that are accessible by executing specific or arbitrary instructions as part of a debugging process. Accordingly, embodiments disclosed herein are directed to systems and methods for executing arbitrary instructions from a context memory of a multithreaded processors. As used herein, the term "arbitrary" includes any executable instruction. Generally, a debug tool or user decides which arbitrary instructions to execute and in which order to achieve a given debugging goal. Examples of arbitrary instructions include, but are not limited to, dumping all the core registers and flags into Random Access Memory (RAM), modifying registers and flag values, accessing memory and peripheral registers in the core address space, and performing Input/Output (I/O) operations.

In various implementations, the systems and methods described herein may be applicable to may different types of microcontrollers, controllers, microprocessors, processors, central processing units (CPUs), programmable devices, etc. These different devices are generically referred to herein as "processors." As such as processor may be configured to perform a wide variety of operations—and may take a variety of forms—depending upon its particular application (e.g., automotive, communications, computing and storage, consumer electronics, energy, industrial, medical, military and aerospace, etc.). Accordingly, as will be understood by a person of ordinary skill in the art in light of this disclosure, the processor(s) described below are provided only for sake of illustration, and numerous variations are contemplated.

In various implementations, systems and methods described herein may be used to execute an arbitrary or debug instruction in a multi-threaded processor with context save/restore features. For example, these systems and methods may allow access by a debug support to system resources only accessible through instructions or may allow execution of an instruction replaced by a software breakpoint with no access to the code memory (e.g., keeping the software breakpoint). Any arbitrary instruction may be executed without interfering with the execution of other threads in the system.

A debug architecture as described herein may include a multithreaded processing system with context memory, such that the context of each thread contains the instruction to be executed next and the program counter (PC). A breakpoint request, whether by a software breakpoint instruction or hardware request, may trigger a save of the thread context and put the thread in a halted state. The debug unit may then access the context memory of one or more halted threads and it may modify the value of the next instruction to be executed to instead execute an arbitrary or debug instruction.

In response to a command from the debug unit, the processor may exit the halted state, restore the context from the context memory, execute the arbitrary instruction, and return to the halted state after saving back the context; thus executing the arbitrary instruction previously written by the debug unit. Other threads in the system may be executed in parallel, going into and out of execution during this procedure. It should be noted that this procedure may be applied to more than one thread in the halted state. Moreover, in some cases these techniques allow a software developer to execute any legal instruction without modifying a processor's enhanced Time Processing Unit (eTPU) Storage Code Memory (SCM).

In sum, the system and methods described herein may employ a context memory to store thread contexts from a core (e.g., registers, flags, etc.), including the next instruction to be executed in the pipeline. One or more processor core(s) may be capable of storing and retrieving several thread contexts into or from a context memory through a context unit, and a debug support unit may have access to the context memory independently of the processor.

Turning to FIG. 1, a block diagram of processor 100 is depicted according to some embodiments. As shown, processing block 101 includes at least one core 102, which may be configured to execute programs, interrupt handlers, etc. In various embodiments, core 102 may include any suitable 8, 16, 32, 64, 128-bit, etc. processing core capable of implementing any of a number of different instruction set architectures (ISAs), such as the x86, POWERPC®, ARM®, SPARC®, or MIPS® ISAs, etc. In additional or alternative implementations, core 102 may be a graphics-processing unit (GPU) or other dedicated graphics-rendering device. Processing block 101 also includes memory management unit (MMU) 103, which may in turn include one or more translation look-aside buffers (TLBs) or the like, and which may be configured to translate logical addresses into physical addresses. Port controller 104 is coupled to processing block 101 and may allow a user to test processor 100, perform debugging operations, program one or more aspects of processor 100, etc. Examples of port controller 104 may include a Joint Test Action Group (JTAG) controller or a Nexus controller. Internal bus 105 couples system memory 106 and Direct Memory Access (DMA) circuit or module 107 to processing block 101. In various embodiments, internal bus 105 may be configured to coordinate traffic between processing block 101, system memory 106, and DMA 107.

System memory 106 may include any tangible or non-transitory memory element, circuit, or device, which, in some cases, may be integrated within processor 100 as one chip. For example, system memory 106 may include registers, Static Random Access Memory (SRAM), Magnetoresistive RAM (MRAM), Nonvolatile RAM (NVRAM, such as "flash" memory), or Dynamic RAM (DRAM) such as synchronous DRAM (SDRAM), double data rate (e.g., DDR, DDR2, DDR3, etc.) SDRAM, read only memory (ROM), erasable ROM (EROM), erasable programmable ROM (EPROM), electrically erasable programmable ROM (EEPROM), etc. In some cases, memory 106 may also include one or more memory modules to which the memory devices are mounted, such as single inline memory modules (SIMMs), dual inline memory modules (DIMMs), etc. DMA 107 includes a programmable data transfer circuit configured to effect certain memory operations (e.g., on behalf of modules 109-111) without intervention from processing block 101.

Input/output (I/O) bus 108 is coupled to internal bus 105 (e.g., via a bus interface) as well as communication module(s) 109, sensor module(s) 110, and control module(s) 111. In some embodiments, I/O bus 108 may be configured to coordinate I/O traffic and to perform any protocol, timing, or other data transformations to convert data signals from one component (e.g., sensor module(s) 110) into a format suitable for use by another component (e.g., processing block 101). Communication module(s) 109 may include, for example, a Controller Area Network (CAN) controller, a serial, Ethernet, or USB controller, a wireless communication module, etc. Sensor module(s) 110 and control module(s) 111 may include circuitry configured to allow processor 100 to interface with any suitable sensor or actuator (not shown).

Embodiments of processor 100 may include, but are not limited to, application specific integrated circuit (ASICs), system-on-chip (SoC) circuits, digital signal processor (DSPs), processors, microprocessors, controllers, microcontrollers, or the like. As previously noted, different implementations of processor 100 may take different forms, and may support various levels of integration. For example, in some applications, DMA 107 may be absent or replaced with custom-designed memory access circuitry. In other applications, internal bus 105 may be combined with I/O bus 108. In yet other applications, one or more other blocks shown in FIG. 1 (e.g., modules 109-111) may be combined into processing block 101. In various embodiments, processor 100 may be a "multi-core" processor having two or more cores (e.g., dual-core, quad-core, etc.) or two or more processing blocks 101. It is noted that elements such as clocks, timers, etc., which are otherwise ordinarily found within processor 100, have been omitted from the discussion of FIG. 1 for simplicity of explanation.

In some embodiments, processor 100 may be employed in real-time, embedded applications (e.g., engine or motor control, intelligent timers, etc.) that benefit from the efficient use of processor 100's processing resources. Additionally or alternatively, processor 100 may be deployed in energy-scarce environments (e.g., in battery or solar-powered devices, etc.) that also benefit from a more efficient use of processing resources. Accordingly, processor 100 may be fitted with elements, circuits, or modules configured to implement one or more temporal multithreading techniques, as described in more detail in connection with FIGS. 2-4.

At this point it is appropriate to note that the term "thread," as used herein, generally refers to a unit of processing, and that the term "multithreading" refers to the ability of a processor (e.g., processor 100) to switch between different threads, thereby attempting to increase its utilization. In some environments, "units of processing" may be referred to as "tasks" or simply as a "processes," and therefore it should be understood that one or more of the techniques described herein may also be applicable to "multitasking" or "multiprocessing." When switching between threads, a processor may also switch between corresponding "contexts." Generally speaking, a "thread context" is a set of data or variables used by a given thread that, if saved or otherwise preserved, allows the thread to be interrupted—e.g., so that a different thread may be executed—and then continued at a later time (specific data or variables making up a thread context may depend upon the type of processor, application, thread, etc.). As also used herein, the term "pipelining" generally refers to a processor's ability to divide each instruction into a particular sequence of operations or stages (e.g., fetch, decode, etc.) and to execute each stage separately. In some cases, distinct electrical circuits or portions of the same processor core (e.g., core 102 in FIG. 1) may be involved in implementing each pipelining stage. Thus, for example, a single processor core may be capable of executing a fetch operation of a first instruction, a decode operation of a second instruction, and an execute operation of a third instruction all concurrently or simultaneously (e.g., during a same clock cycle).

When a thread's execution is complete or otherwise halted (e.g., upon actual completion of the thread, triggering of an interrupt, etc.), a context read/write controller may retrieve an updated thread context from a respective register set, and it may store the updated context in a context memory. In various implementations, the context memory may be separate from system memory 106 or it may be dedicated exclusively to the storage of thread contexts or it may be accessible by software.

In some embodiments, a multithreading control engine may be configured to control the transit or flow of thread contexts between a context memory and two or more register sets in response to a signal, command, or indication received from an external thread control circuit. Examples of such signals include sources or events (i.e., context switch events) such as, for instance, hardware or software schedulers, timer overflows, completion of external memory operations, completion of analog to digital conversions, logic level changes on a sensor's input, data received via a communication interface, entering of a sleep or power-saving mode, etc.

Various of the systems and methods described herein may provide a processor configured to executes many threads, via hardware-switching, and using only two context register sets. Other embodiments may include more context register sets. Moreover, the processor uses two thread contexts during at least one or more of the same clock cycles—i.e., concurrently, simultaneously, or in parallel. Accordingly, pipeline stages within such a processor may therefore remain busy, even during context switch operations, thus improving its utilization and efficiency. A separate memory (e.g., a context memory) may be used for context saving, and it may be invisible to the programming or software model, thus not interfering with its execution.

In many implementations, a large number of thread contexts may be stored in a dedicated context memory at a small design or silicon cost (e.g., RAM has a relatively small footprint or power requirements), thus reducing the need for relatively more expensive components. As a person of ordinary skill in the art will recognize in light of this disclosure, these and other features may enable a more efficient use of processor resources or electrical power.

Figure 2:
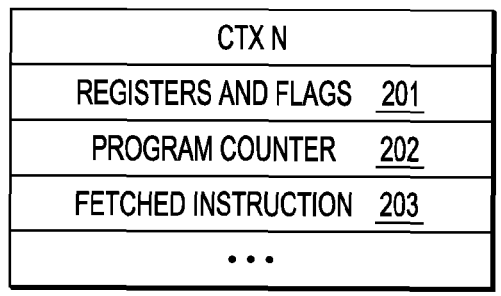
FIG. 2 is a block diagram of an example of a context memory according to some embodiments.

FIG. 2 is a block diagram of an example of a context memory according to some embodiments. Although only one thread context (CTX N) 200 is shown, it should be noted that a single context memory may include many thread contexts, and many contexts for each thread. As illustrated, thread context CTX N 200 includes a plurality of register or flag values 201, a program counter (PC) 202, and one or more fetched instructions 203 to be subsequently executed in the execution pipeline.

Figure 3:
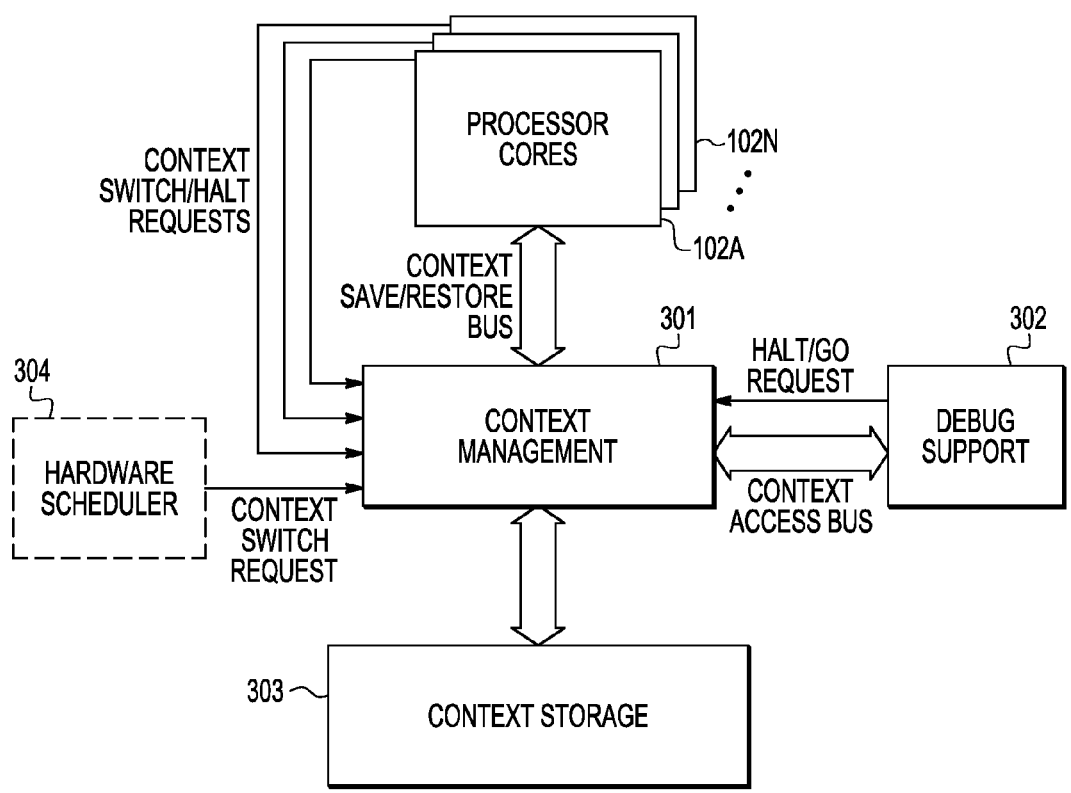
FIG. 3 is a block diagram of an example of a debug architecture for multithreaded processors according to some embodiments.

FIG. 3 is a block diagram of an example of debug architecture 300 for multithreaded processors. In some embodiments, architecture 300 may be implemented in connection with processor 100 of FIG. 1. Particularly, context storage block 303 may be used to implement a context memory outside of processor cores 102A-N. Context management block 301 may include, for instance, a context read/write controller or a multithreading control engine. In operation, processor core(s) 102A-N may be configured to execute one or more threads simultaneously or concurrently, and each core may be capable of switching between two or more such threads or processes.

Still in FIG. 3, debug support block 302 is coupled to context management block 301, which in turn is coupled to processor core(s) 102A-N, context storage block 303, and hardware scheduler block 304. Generally, debug support block 302 may be configured to send halt and go requests or commands to context management block 301 in order to initiate or terminate a debug process. The debug process may be triggered, for example, under control or hardware scheduler block 304 or in response to a command from software (e.g., a breakpoint) under execution by the processor core(s) 102A-N. Debug support block 302 may also access content storage block 303 via context management block 301 via a context access bus or the like.

Processor core(s) 102A-N may be configured to perform context save and restore transactions with context storage 303 through context management block 301 via a save/restore bus. Processor core(s) 102A-N may also receive or transmit context switch or halt requests to or from context management block 301. Hardware scheduler 304 may be configured to issue context switch requests to context management block 301.

In some embodiments, the modules or blocks shown in FIG. 3 may represent processing circuitry or sets of software routines, logic functions, or data structures that, when executed by the processing circuitry, perform specified operations. Although these modules are shown as distinct blocks, in other embodiments at least some of the operations performed by these blocks may be combined into fewer blocks. Conversely, any given module may be implemented such that its operations are divided among two or more blocks. Although shown with a particular configuration, in other embodiments these various modules or blocks may be rearranged in other suitable ways.

Figure 4:
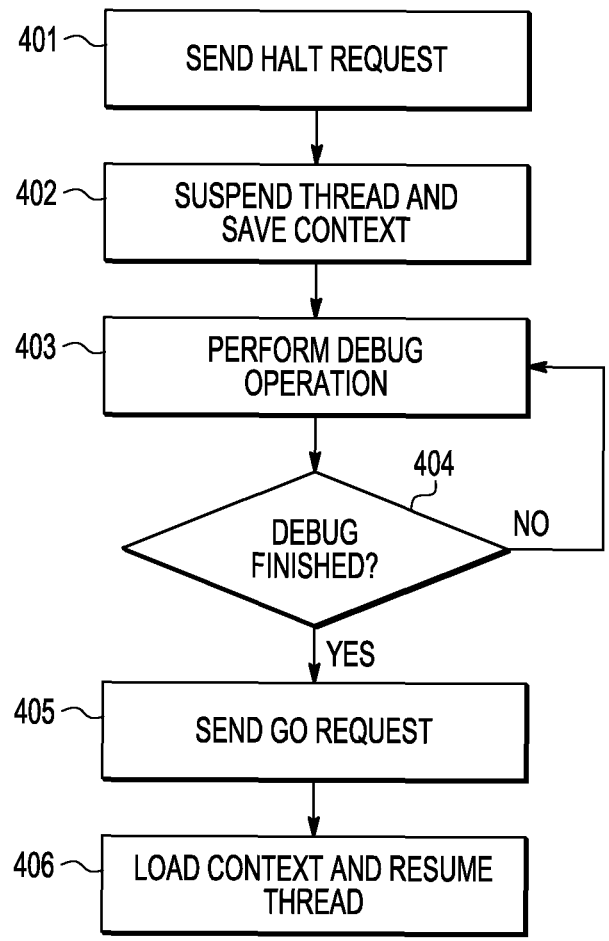
FIG. 4 is a flowchart of a method for performing a debug procedure for multithreaded processors according to some embodiments.

Operation of debug architecture 300 may be explained generally with reference to FIG. 4. Specifically, FIG. 4 is a flowchart of method 400 for performing a debug procedure in multithreaded processors according to some embodiments. At block 401, method 400 includes sending a halt request from debug support block 302 to context management block 301. The halt request or command may be received, for example, in response to a command from hardware scheduler 304 or in response to a command from debug software under execution by processor core(s) 102A-N.

At block 402, in response to receiving a halt command, context management block 301 may cause a given one of processor cores 102A-N to save the context of a thread onto context storage block 303, and may suspend execution of that thread. At block 403, a debug operation is performed based upon the context stored in context storage 303, and without there having to be access to internal components of processor core(s) 102A-N (e.g., registers, etc.). At block 404, debug support block 302 determines whether the debug process is finished. If not control returns to block 403.

If the debug process is finished, then at block 405 debug support block 302 sends a go request or command to context management block 301, which at block 406 allows processor core(s) 102A-N to load the context of the thread from context storage block 303 back onto internal registers of processor core(s) 102A-N and resume execution of that thread.

In some embodiments, processor core(s) 102A-N may be configured to execute a second thread at least in part while the execution of a first thread is suspended. The second thread may be executed using a second context stored in the context memory prior to receipt of the go command. Moreover, two or more debug operations may be performed concurrently for two different threads. For example, in response to receiving a second halt command, the second context may be stored in the context memory, execution of the second thread may be suspended, and a debug of the second thread may be executed at least in part concurrently with the debug of the first thread using the second context— that is, the second halt command may be issued prior to issuance of the first thread's go command.

Also, in some cases, in response to receiving a context switch command from hardware scheduler 304, for example, and after having received the halt command, context management block 301 prioritizes execution of the context switch command over execution of the halt command.

Figure 5:
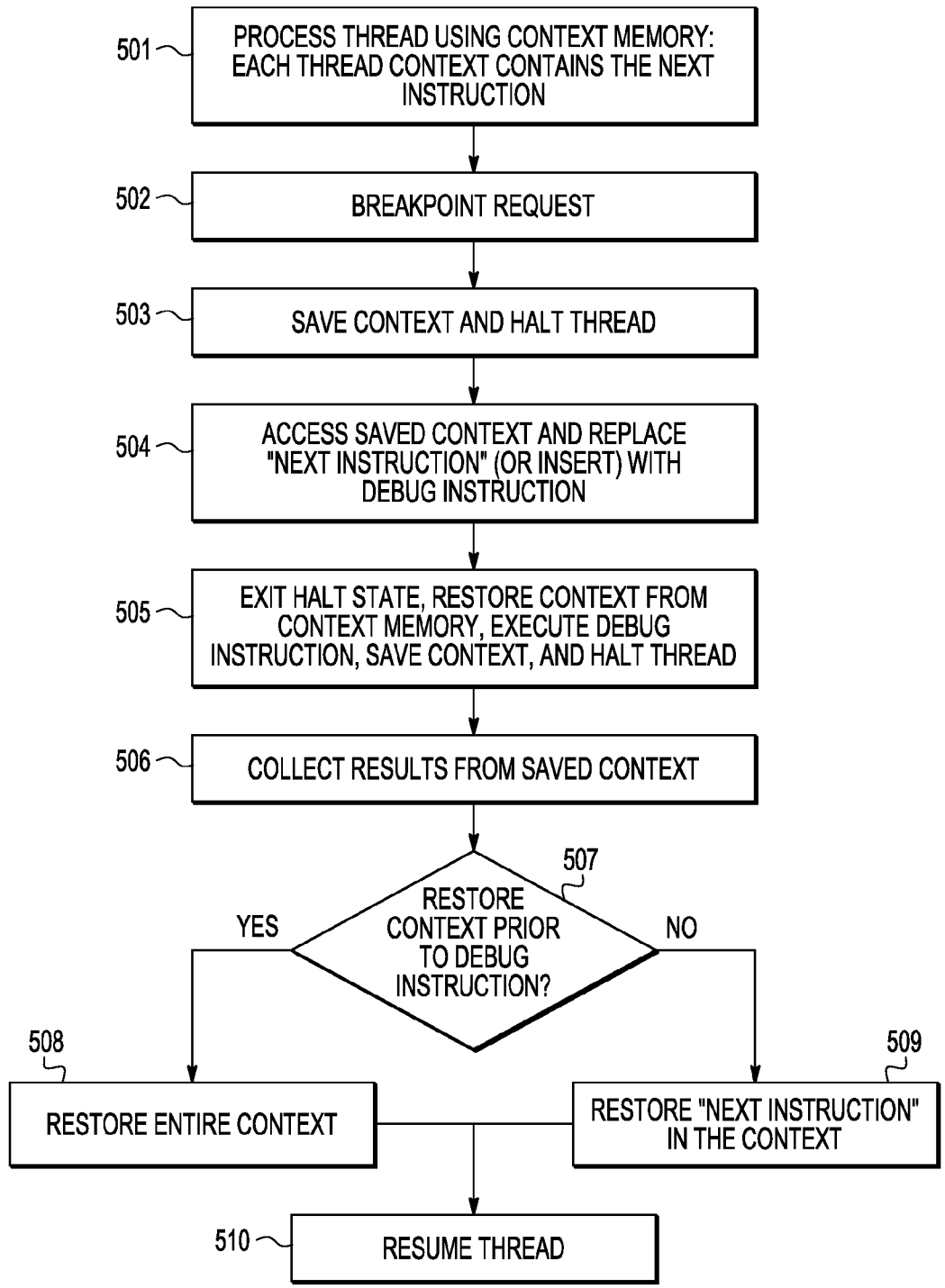
FIG. 5 is a flowchart of a method for executing arbitrary instructions from a context memory as part of a debug operation according to some embodiments.

As noted above, in many situations debug operations may need to evaluate resources that are accessible by executing specific or arbitrary instructions as part of the debugging process. Accordingly, FIG. 5 is a flowchart of a method for executing arbitrary instructions from context storage 303 as part of a debug operation, according to some embodiments.

At block 501, a processor core 102 may execute a thread based on a thread context stored in context memory 303. At block 502, context management circuit 301 receives a breakpoint request, for example, as a halt request issued by debug support block 302 as part of a software debug operation or as a hardware request issued by hardware scheduler 304.

In response to the breakpoint request, context management circuit 301 causes the current thread context to be saved for that thread, and puts the thread in a halted state at block 503. At block 504, debug support unit 302 can access the saved context stored in context memory 303 via context management block 301, and it may modify that context in any suitable manner.

For example, debug support block 302 may insert an arbitrary or debug instruction in the saved context for the thread at issue. Additionally or alternatively, debug support block 302 may replace the next instruction in the execution pipeline with the arbitrary or debug instruction, for example, while making a copy of the context before the instruction being replaced.

At block 505, the thread may exit the halted state, and context management block 301 may restore the modified thread context from context memory 303 so that processing core 102 may execute the arbitrary or debug instruction. Context management block 301 then saves the new thread context resulting from the execution of the arbitrary or debug instruction and again halts the thread. At block 506, debug support block 502 may collect contents (e.g., register values, etc.) of the resulting thread context for debugging purposes.

At block 507, method 500 involves determining whether to restore the thread context as it was before the insertion of the arbitrary or debug instruction. If so, block 508 restores the original thread context in its entirety. Otherwise, at block 509, method 500 restores the thread context that resulted from the execution of the arbitrary or debug instruction, but with the fetched instruction(s) of the original thread context. The PC associated with the context may also be incremented or decremented as needed to avoid interfering with normal software execution.

In various implementations, the decision at block 507 may be performed by a user operating a debug software configured to interact with debug support block 302. Then, at block 510, processor core 102 may resume thread execution using one of the two thread contexts of blocks 508 or 509.

As such, any arbitrary instruction may be executed without interfering with the execution of other threads in the system. Other threads may be executed in parallel, going into and out of execution during method 500. It should be noted that method 500 may be applied to more than one thread at the same time.

As described herein, in an illustrative, non-limiting embodiment, an integrated circuit may include a processor core; a context management circuit coupled to the processor core; and a debug support circuit coupled to the context management circuit, where: the context management circuit is configured to halt a thread running on the processor core and save a halted thread context for that thread into a context memory distinct from the processor core, where the halted thread context comprises a fetched instruction as the next instruction in the execution pipeline; the debug support circuit is configured instruct the context management circuit to modify the halted thread context in the context memory by replacing the fetched instruction with an arbitrary instruction; and the context management circuit is further configured to cause the thread to resume using the modified thread context to execute the arbitrary instruction.

In some cases, the breakpoint request may be a software request issued by a debug software. Additionally or alternatively, the breakpoint request may be a hardware request issued in response to a command from a scheduling circuit coupled to the context management circuit.

In various implementations, the context management circuit may be configured to cause the thread to resume using the un-modified, halted thread context, after execution of the arbitrary instruction. The context management circuit may also be configured to save another thread context resulting from the execution of the arbitrary instruction into the context memory.

The debug support circuit may be configured to copy contents of the other thread context from the context memory to perform one or more debug operations. And the context management circuit may be configured to cause the thread to resume using contents of the other thread context with the fetched instruction as the next instruction in the execution pipeline.

In another illustrative, non-limiting embodiment, a method may include, in response to a breakpoint request, halting a thread running on a processor core and saving an original thread context corresponding to the halted thread into a context memory distinct from the processor core; creating a modified thread context by inserting into the original thread context an arbitrary instruction as the next instruction to be executed; and resuming the thread using the modified thread context to execute the arbitrary instruction.

The method may include saving a current thread context resulting from the execution of the arbitrary instruction into the context memory and using contents of the current thread context to perform one or more debug operations. The method may also include halting the thread after execution of the arbitrary instruction, replacing a current thread context resulting from the execution of the arbitrary instruction with the original thread context, and resuming the thread using the original thread context.

Inserting the arbitrary instruction may include replacing a fetched instruction with the arbitrary instruction as part of the original thread context. And the method may further include halting the thread after execution of the arbitrary instruction, altering a current thread context stored in the context memory as a result of the execution of the arbitrary instruction by inserting the fetched instruction into the current thread context, and resuming the thread using the altered thread context.

In yet another illustrative, non-limiting embodiment, a debug support circuit may include a logic unit; and a memory coupled to the logic unit, the memory having program instructions stored thereon that, upon execution by the logic unit, cause the debug support circuit to: transmit a breakpoint request to a context management circuit, where the context management circuit is coupled to a processor, and where the context management circuit is configured to cause execution of a thread running on the processor to be suspended and to save a first thread context into a context memory distinct from the processor; instruct the context management circuit to create a second thread context in the context memory by inserting an arbitrary instruction into the first thread context, where the context management circuit allows the thread to resume using the second thread context;

and enable debugging of the thread by retrieving results of the execution of the arbitrary instruction from the context memory.

The context management circuit may be configured to halt the thread after execution of the arbitrary instruction, and to allow the thread to resume using the first thread context. Inserting the arbitrary instruction may include replacing a fetched instruction with the arbitrary instruction.

The context management circuit may be configured to halt the thread after execution of the arbitrary instruction, and the program instructions, upon execution by the logic unit, may further cause the debug support circuit to restore the first thread context in the context memory by inserting the fetched instruction into the second thread context, and resuming the thread using the restored first thread context.

Additionally or alternatively, the context management circuit may be configured to halt the thread after execution of the arbitrary instruction, and the program instructions, upon execution by the logic unit, may further cause the debug support circuit to modify a third thread context stored in the context memory as a result of the execution of the arbitrary instruction by inserting the fetched instruction into the third thread context, and resuming the thread using the modified third thread context.

In some embodiments, the blocks shown in FIGS. 1-3 may represent processing circuitry or sets of software routines, logic functions, or data structures that, when executed by the processing circuitry, perform specified operations. Although these modules are shown as distinct logical blocks, in other embodiments at least some of the operations performed by these modules may be combined in to fewer blocks. Conversely, any given one block may be implemented such that its operations are divided among two or more logical blocks. Although shown with a particular configuration, in other embodiments these various modules or blocks may be rearranged in other suitable ways.

It should be understood that the various operations explained herein, particularly in connection with FIGS. 4 and 5 may be implemented in software executed by processing circuitry, hardware, or a combination thereof. The order in which each operation of a given method is performed may be changed, and various elements of the systems illustrated herein may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The term "coupled" is defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An integrated circuit, comprising
   a processor core;
   a context management circuit coupled to the processor core; and
   a debug support circuit coupled to the context management circuit, wherein:
      the context management circuit is configured to halt a thread running on the processor core and save a halted thread context for that thread into a context memory distinct from the processor core, wherein the halted thread context comprises a fetched instruction as the next instruction in the execution pipeline;
      the debug support circuit is configured instruct the context management circuit to modify the halted thread context in the context memory by inserting an arbitrary instruction; and
      the context management circuit is further configured to cause the thread to resume, using the modified thread context to execute the arbitrary instruction.

2. The integrated circuit of claim 1, wherein the breakpoint request is a software request issued by a debug software.

3. The integrated circuit of claim 1, wherein the breakpoint request is a hardware request issued in response to a command from a scheduling circuit coupled to the context management circuit.

4. The integrated circuit of claim 1, wherein the context management circuit is configured to cause the thread to resume using the un-modified, halted thread context, after execution of the arbitrary instruction.

5. The integrated circuit of claim 1, wherein the context management circuit is configured to save another thread context resulting from the execution of the arbitrary instruction into the context memory.

6. The integrated circuit of claim 5, wherein the debug support circuit is configured to copy contents of the other thread context from the context memory to perform one or more debug operations.

7. The integrated circuit of claim 5, wherein the context management circuit is configured to cause the thread to resume using contents of the other thread context with the fetched instruction as the next instruction in the execution pipeline.

8. A method, comprising:
   in response to a breakpoint request, halting a thread running on a processor core and saving an original thread context corresponding to the halted thread into a context memory distinct from the processor core;
   creating a modified thread context by inserting into the original thread context an arbitrary instruction as the next instruction to be executed; and
   resuming the thread using the modified thread context to execute the arbitrary instruction.

9. The method of claim 8, wherein the breakpoint request is a software request.

10. The method of claim 8, wherein the breakpoint request is a hardware request.

11. The method of claim 8, further comprising saving a current thread context resulting from the execution of the arbitrary instruction into the context memory and using contents of the current thread context to perform one or more debug operations.

12. The method of claim 8, further comprising halting the thread after execution of the arbitrary instruction, replacing a current thread context resulting from the execution of the arbitrary instruction with the original thread context, and resuming the thread using the original thread context.

13. The method of claim 8, wherein inserting the arbitrary instruction includes replacing a fetched instruction with the arbitrary instruction as part of the original thread context.

14. The method of claim 13, further comprising halting the thread after execution of the arbitrary instruction, altering a current thread context stored in the context memory as a result of the execution of the arbitrary instruction by inserting the fetched instruction into the current thread context, and resuming the thread using the altered thread context.

15. A debug support circuit, comprising:
a logic unit; and
a memory coupled to the logic unit, the memory having program instructions stored thereon that, upon execution by the logic unit, cause the debug support circuit to:
transmit a breakpoint request to a context management circuit, wherein the context management circuit is coupled to a processor, and wherein the context management circuit is configured to cause execution of a thread running on the processor to be suspended and to save a first thread context into a context memory distinct from the processor;
instruct the context management circuit to create a second thread context in the context memory by inserting an arbitrary instruction into the first thread context, wherein the context management circuit allows the thread to resume using the second thread context; and
enable debugging of the thread by retrieving results of the execution of the arbitrary instruction from the context memory.

16. The debug support circuit of claim 15, wherein the breakpoint request is a software or hardware request.

17. The debug support circuit of claim 15, wherein the context management circuit is configured to halt the thread after execution of the arbitrary instruction to allow the thread to resume using the first thread context.

18. The debug support circuit of claim 15, wherein inserting the arbitrary instruction includes replacing a fetched instruction with the arbitrary instruction.

19. The debug support circuit of claim 18, wherein the context management circuit is configured to halt the thread after execution of the arbitrary instruction, wherein the program instructions, upon execution by the logic unit, further cause the debug support circuit to restore the first thread context in the context memory by inserting the fetched instruction into the second thread context, and resuming the thread using the restored first thread context.

20. The debug support circuit of claim 18, wherein the context management circuit is configured to halt the thread after execution of the arbitrary instruction, wherein the program instructions, upon execution by the logic unit, further cause the debug support circuit to modify a third thread context stored in the context memory as a result of the execution of the arbitrary instruction by inserting the fetched instruction into the third thread context, and resuming the thread using the modified third thread context.

* * * * *